(12) United States Patent
Lee et al.

(10) Patent No.: US 8,290,647 B2
(45) Date of Patent: Oct. 16, 2012

(54) APPARATUS FOR INTEGRALLY MANAGING SHIP DEVICE AND METHOD THEREOF

(75) Inventors: Chang Eun Lee, Daejeon (KR); Jun Hee Park, Daejeon (KR); Kwangil Lee, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 592 days.

(21) Appl. No.: 12/506,443

(22) Filed: Jul. 21, 2009

(65) Prior Publication Data

US 2010/0161161 A1 Jun. 24, 2010

(30) Foreign Application Priority Data

Dec. 19, 2008 (KR) .................. 10-2008-0130142

(51) Int. Cl.
*G06F 17/00* (2006.01)
(52) U.S. Cl. .................................................. 701/21
(58) Field of Classification Search ............. 701/21, 701/24, 36, 29.1, 29.2, 29.3, 29.4, 31.4, 31.5, 701/31.6, 32.7, 34.4
See application file for complete search history.

(56) References Cited

U.S. PATENT DOCUMENTS

2009/0210562 A1* 8/2009 Huang et al. .................. 710/5

FOREIGN PATENT DOCUMENTS

| JP | 2006-327361 A | 12/2006 |
|---|---|---|
| KR | 1020010097908 A | 11/2001 |
| KR | 1020030080774 A | 10/2003 |
| KR | 10-0749392 B1 | 8/2007 |

OTHER PUBLICATIONS

Chang Eun Lee; "Ship Device Management Architecture and Manufacture of Inter-working Framework", (W/English translation of items 1.1 to 2.1), Published by Electronics and Telecommunications Research Institute (ETRI), Oct. 2008, 9 pages total.

* cited by examiner

*Primary Examiner* — Kim T Nguyen
(74) *Attorney, Agent, or Firm* — Ladas & Parry LLP

(57) ABSTRACT

An apparatus for integrally managing a ship includes a device manager for integrally managing different types of local ship devices in the ship by using a standardized protocol message; a local device manager for managing local ship devices in a legacy environment on the basis of an independent local protocol; and an inter-working framework (IWF) for performing translation of a protocol for compatibility between the standardized protocol and the independent local protocol to manage the different types of local ship devices between the device manager and the local device manager. The device manager receives a remote control instruction for remotely maintaining and repairing the local ship device from a remote server connected through a wired/wireless communication network.

5 Claims, 16 Drawing Sheets

APPARATUS FOR INTEGRALLY MANAGING SHIP DEVICE AND METHOD THEREOF

CROSS-REFERENCE(S) TO RELATED APPLICATION(S)

The present invention claims priority of Korean Patent Application No. 10-2008-0130142, filed on Dec. 19, 2008, which is incorporated herein by reference.

FIELD OF THE INVENTION

The present invention relates to a method for remotely maintaining and repairing various devices in a ship; and, more particularly, to an apparatus and a method for integrally managing a number of and different kinds of local devices in a ship in a standard form through a hierarchical ship device management architecture (SDMA) for providing automatic configuration management, maintenance management, and service instruction management of the local devices; and an inter-working framework (IWF) structure for exchanging and integrating data and generating new data by connecting an operation mechanism to the local devices of a sub-system independently operated in a ship.

BACKGROUND OF THE INVENTION

In current ship environments, a number of ship devices build and manage various legacy environments based on their own protocols. Therefore, in the current ship environments, there is no structure for integrally managing local devices of independent sub-systems of a ship due to different properties between device management and information of independent systems of the ship and information of the various local devices of the ship is not shared by the sub-systems, providing only their own device management and approach method through independent local protocols.

FIG. 1 is a block diagram illustrating an existing complex navigation device for a ship. As illustrated in FIG. 1, a navigation automation system and an engine monitoring/controlling system constitute a complex navigation device for a ship integrated by a database and a network. The complex navigation device includes an own ship database (OSDB) system including a local area network (LAN) constituting a dual network, a main server for an OSDB connected to the dual LAN, a common storage, and an OSDB backup server, an engine system connected to the dual LAN to control and monitor a main engine remotely and in real time, and a plurality of client systems. In that regard, each system is constituted by a main network connected by an ATM switch of the LAN and a backup network connected to a switching hub. The structure enables a land head office or a management department to control and monitor management of the ship.

In order to build a complex navigation device for a ship, the existing technology collects information from sub-systems in the ship such as a database 100, a navigation automation system 102, an unloading monitoring system 110, an engine monitoring system 108, a introversion performance evaluation system 106, and an ISMS 104 by connecting the sub-systems using a dual LAN 120; stores the collected information in the database 100; and manages the ship device based on data stored in the database 100. However, different properties of local device managing methods and information of the independent systems of the ship makes integration and management of local devices of the independent sub-systems difficult.

Since the existing technology cannot integrally manage the different sub-systems for the ship and cannot suggest a structure and a protocol for interoperating different ship devices, there is a limit in a ship device managing method capable of accommodating various device groups and legacy protocols in a ubiquitous ship environment.

SUMMARY OF THE INVENTION

It is, therefore, an object of the present invention to provide an apparatus and a method for integrally managing a number of and different kinds of local devices in a ship in a standard form through a hierarchical ship device management architecture (SDMA) for providing automatic configuration management, maintenance management, and service instruction management of the local devices; and an inter-working framework (IWF) structure for exchanging and integrating data and generating new data by connecting an operation mechanism to the local devices of a sub-system independently operated in a ship.

In accordance with one aspect of the invention, an apparatus for integrally managing a ship, including: a device manager for integrally managing different types of local ship devices in the ship by using a standardized protocol message; a local device manager for managing local ship devices in a legacy environment on the basis of an independent local protocol; and an inter-working framework (IWF) for performing translation of a protocol for compatibility between the standardized protocol and the independent local protocol to manage the different types of local ship devices between the device manager and the local device manager.

The IWF may include an application interoperating part for providing interoperability between peer services of the different types of local ship devices; a protocol interoperating part for providing interoperability between messages of the different types of local ship devices at an application level; and a data meaning interoperating part for providing interoperability between meanings of messages of the different types of local ship devices.

The application interoperating part may include a mechanism translator for providing interoperability between discovering mechanisms of the different types of local ship devices; a mutual information collector for collecting device information through interoperability between collecting mechanisms of the different types of local ship devices; a mutual controller/monitor for controlling or monitoring devices through interoperability between controlling/monitoring mechanisms of the different types of local ship devices; and a mutual event processor for registering or removing events of the local ship devices through interoperability between event registering/removing mechanisms of the different types of local ship devices.

The protocol interoperating part may include a protocol translator for performing mutual translation between the local protocol and a standardized meta protocol; and a data format translator for performing mutual translation between a message format of the local protocol and a message format of the standardized meta protocol.

The device manager preferably receives a remote control instruction for remotely maintaining and repairing the local ship device from a remote server connected through a wired/wireless communication network.

In accordance with another aspect of the invention, a method for registering a local ship device in an apparatus for integrally managing a ship including a device manager and a local device manager, including: registering a plurality of local ship devices by allowing the local device manager to set sessions with the local ship devices; transmitting information of the registered local ship device by allowing the local device manager to set sessions to the device manager; and registering the local device manager and information of the registered local ship device by the device manager.

After said registering the information of the local ship device, the local device manager may manage the registered local ship device by allotting an ID thereto.

After said registering the local device manager, the device manager may allot an ID to the registered local device manager.

In accordance with still another aspect of the invention, a method for collecting information of local ship devices in an apparatus for integrally managing a ship including a device manager and a local device manager, including: receiving a state information collection request for a local ship device from the device manager by the local device manager; collecting state information of a subordinate local ship device by the local device manager in response to the state information collection request; transmitting the collected state information of the local ship device to the device manager by the local device manager; and updating information of the local ship device using the transmitted state information of the local ship device by the device manager.

In said receiving the state information collection request, the local device manager may receive from the device manager a message for requesting collection of state information of the local ship device.

The message from the device manager may constitute a standardized meta protocol message and be translated to a local protocol message of the local device manager through an inter-working framework (IWF) to be transmitted to the local device manager.

The request for collection of the state information may be prompted by a request from a remote server connected to the device manager through a wired/wireless communication network.

In accordance with still another aspect of the invention, a method for releasing connection of a local ship device in an apparatus for integrally managing a ship including a device manager and a local device manager, including: periodically checking by the local device manager whether a subordinate local ship device is normally operated; releasing connection to the local ship device determined not to be normally operated after the checking; and transmitting to the device manager information regarding the local ship device whose connection is released.

In the checking, the local device manager may transmit a response request message to the local ship device and determines that the local ship device is not normally operated when a response message for the response request message is not received for more than a specific period of time from the local ship device.

After the releasing, the local device manager may delete from a local device database the local ship device whose connection is released.

After the transmitting, the device manager may delete from the local device management database the local ship device whose connection is released.

In accordance with still another aspect of the invention, a method of managing operation of a local ship device in an apparatus for integrally managing a ship including a local device manager and a device manager, including: receiving by the local device manager a monitor or control request for the local ship device from the device manager; monitoring or controlling the local device by the local device manager in response to the monitor or control request; and transmitting by the local device manager a monitoring or controlling result for the local device to the device manager.

In the receiving, the local device manager may receive from the device manager a message that request monitoring or controlling the local ship device.

The message from the device manager may constitutes a standardized meta protocol message and be translated to a local protocol message of the local device manager through an inter-working framework (IWF) to be transmitted to the local device manager.

The monitor or control request may be prompted by a request from a remote server connected to the device manager through a wired/wireless communication network.

The present invention effectively integrates and manages a number of and different kinds of ship devices by mutually connecting ship systems independently operated in a ship, enabling exchange and integration of materials and creation of new materials, and suggesting a new method enabling a new additional service through those, in order to integrally manage many different devices in the ship.

The present invention also lays a cornerstone of an e-navigation market of ship devices based on a ship device integration and management structure and an interoperability technology, allows a ship device developer to be equipped with an environment in which various ship applications can be easily developed regardless of different field bus environments peculiar to his or her own company, and allows a ship owner to freely select ship devices regardless of specific systems. Further, the present invention also creates various services driven through connection between different ship devices based on the ship device integration and management structure and the interoperability technology in association with an intelligent unmanned automatic service mechanism.

BRIEF DESCRIPTION OF THE DRAWINGS

The above and other aspects and features of the present invention will become apparent from the following description of embodiments given in conjunction with the accompanying drawings, in which.

DETAILED DESCRIPTION OF THE EMBODIMENTS

Hereinafter, an embodiment of the present invention will be described in detail with reference to the accompanying drawings. In the description of the invention, a detailed description of related known structures and functions will be omitted to avoid obscuring the scope of the present invention. The terms used below are defined considering their functions in the invention, and may become different according to intentions and practices of a user or a manager. Therefore, the definitions of the terms should be construed on the basis of the contents of the overall specification.

Figure 1:
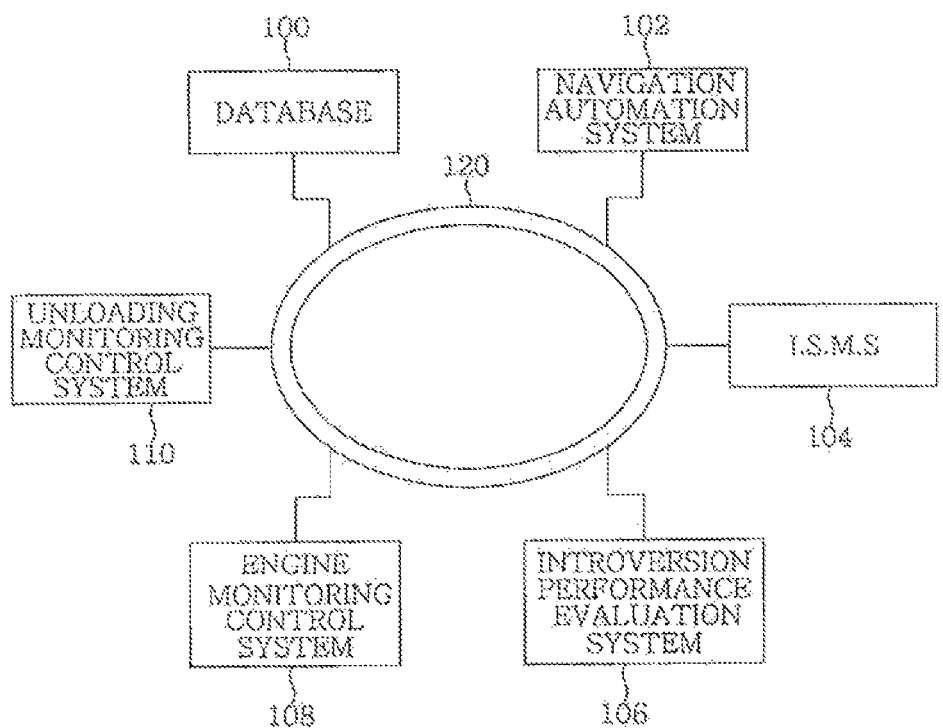
FIG. 1 is a block diagram illustrating an existing subsystem of a ship.
Figure 2:
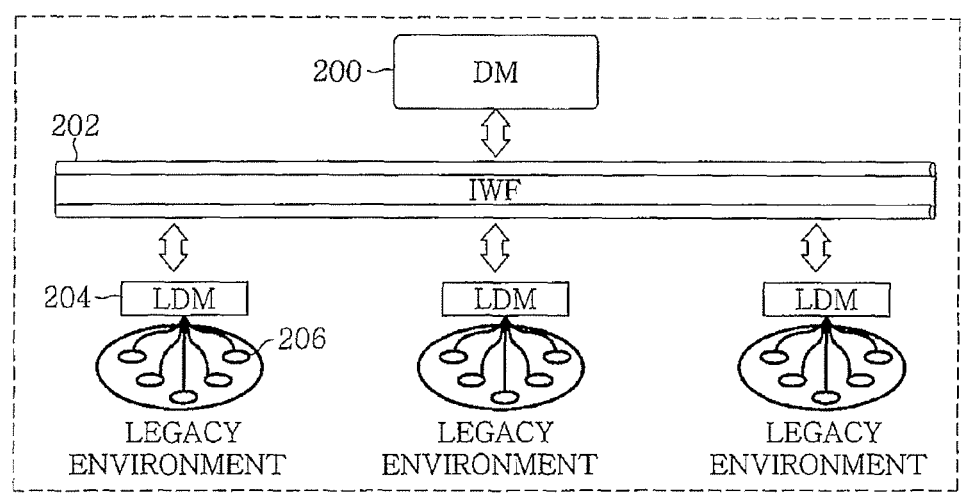
FIG. 2 is a concept view illustrating an inter-working framework (IWF) in a structure for integrally managing a ship device in accordance with an embodiment of the invention.

FIG. 2 is a concept view illustrating an operation of integrally and mutually managing different types of ship devices through a ship device management architecture (SDMA) in a standardized form in accordance with an embodiment of the present invention.

Referring to FIG. 2, the SDMA includes a device manager (DM) 200 integrally managing all devices in a ship in a standardized form; a local device manager (LDM) 204 managing local devices in a legacy environment by a customized method based on an independent local protocol; and local devices 206 constituting a local device network. An interworking framework (IWF) 202 has a framework structure for mutual management of a ship device that enables exchange and integration of data and generation of new data by mutually connecting devices of a sub-system independently operated in a ship to enable a new additional service.

Figure 3:
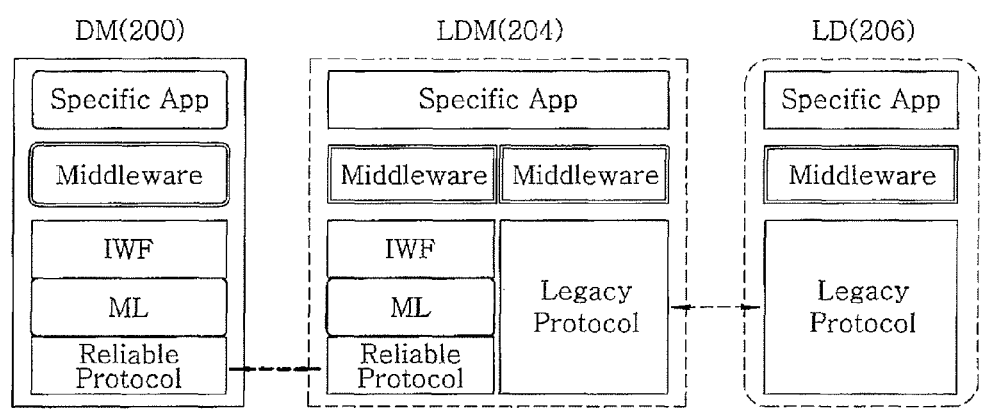
FIG. 3 is a view illustrating a protocol stack structure of the IWF in accordance with an embodiment of the present invention.

FIG. 3 illustrates a protocol stack of the DM 200, the LDM 204, and the LD 206, i.e., the elements of the ship device managing structure in accordance with an embodiment of the invention.

Referring to FIG. 3, a specific application refers to a device's own application and represents a different feature depending on the type and manufacturer of the device. On the other hand, a middleware represents an application common to different devices. The contents of the middleware of the DM 200, the LDM 204, the LD 206, i.e., the elements of the SDMA for integrally managing the ship devices will be described below. The IWF 202 represents a mutual management framework for embracing different features of different types of the devices, and a messaging layer (ML) provides a communication interface to an application.

Figure 4:
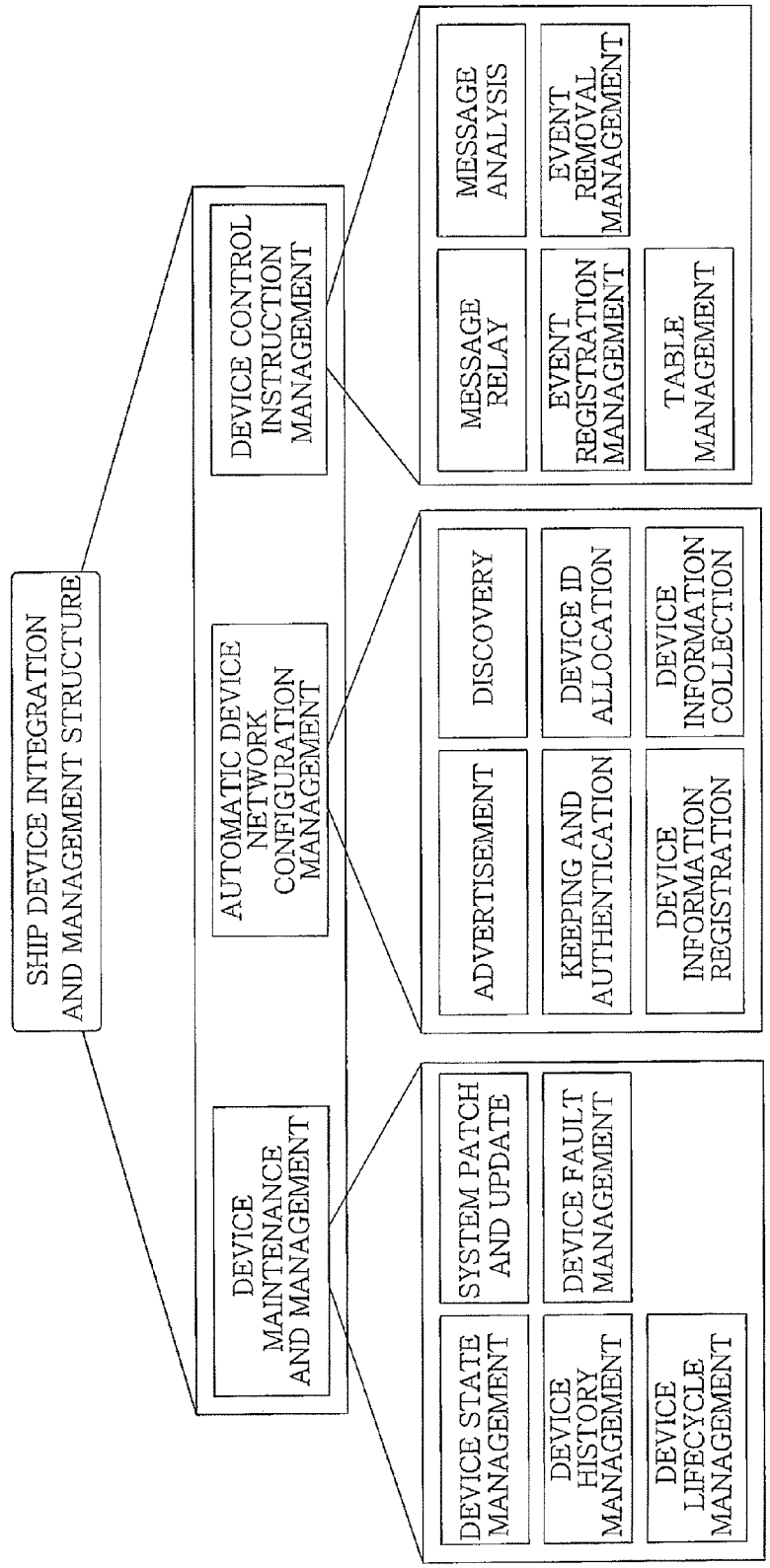
FIG. 4 is a concept view illustrating a provision function in the structure for integrally managing a ship device in accordance with an embodiment of the present invention.

FIG. 4 illustrates functions provided by the ship device managing structure in accordance with an embodiment of the invention.

Hereinafter, the functions provided by the ship device managing structure will be described with reference to FIG. 4.

First, a device maintaining/managing function is as follows. Device lifecycle management is a function of managing a lifecycle of a device and has states of INIT, ACTIVE, INACTIVE, and BLOCKED. Device function state management provides a function of managing a device's own state, and device performance state management represents management of common function states of devices, e.g., a CPU utilization and usage of a memory and a hard disk drive (HDD) and the like. The device maintaining and managing function provides a system patch and update managing function and provides a function of storing log information of a device and responding to a query through device history management. Device fault management provides self-detection of a fault, diagnosis, restoration, and reporting.

Next, an automatic device network configuration managing function is as follows. Advertisement provides an advertisement function for connection to a network of the ship device managing structure and discovery provides a search function for connection to a network of the ship device managing structure. The automatic device network configuration managing function allots a new device ID through device ID assignment function, collects device information with the SDMA structure stratified through device information registration and collection, and provides a device authenticating function and a data encoding function for security with authentication and security.

Next, a device control instruction managing function is as follows. A message relay function provides a function of relaying a message and a message parsing function provides a function of analyzing a message. An event registration management function provides a function of managing the registration of an event and an event removal management function provides a function of removing an event. A table management function provides a function of managing synchronization of a table during updating of a device state.

Figure 5:
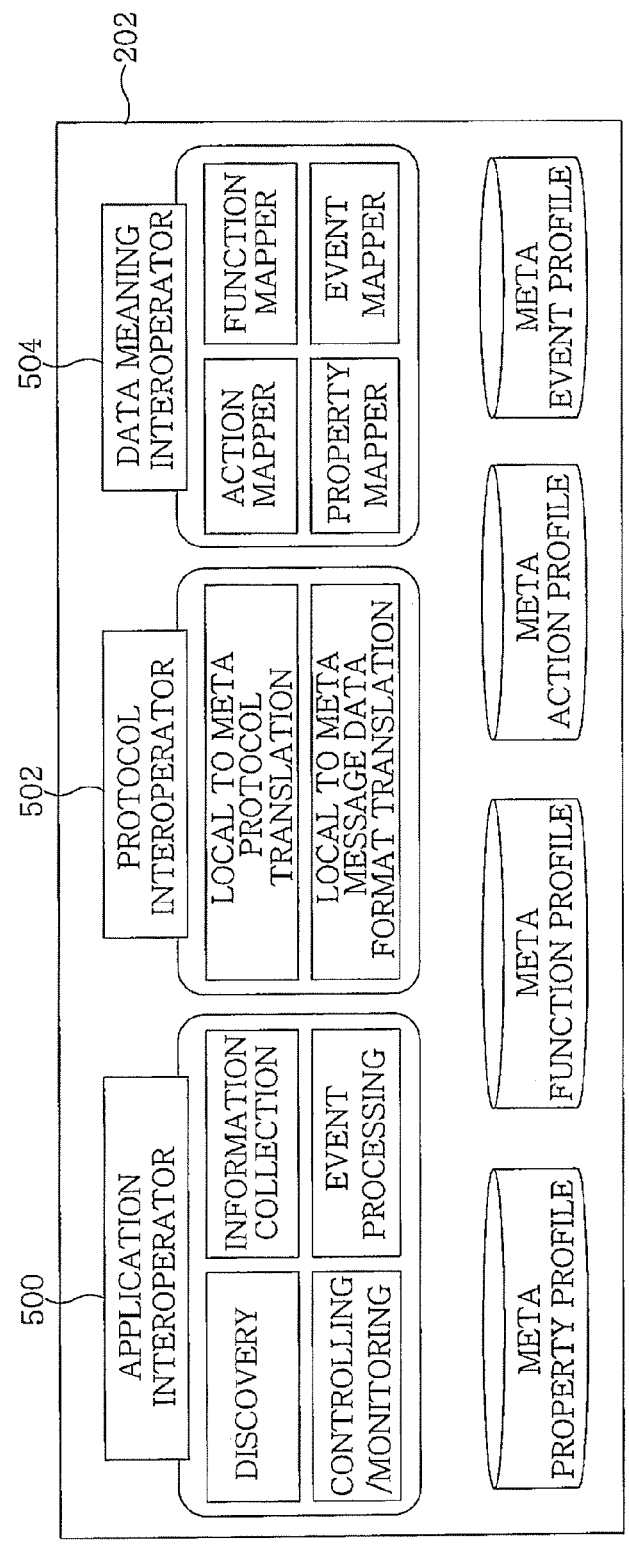
FIG. 5 is a view illustrating the structure of the IWF in accordance with an embodiment of the present invention.

FIG. 5 illustrates the structure of the IWF 202 for the ship device in accordance with an embodiment of the invention.

As illustrated in FIG. 5, the IWF 202 includes a protocol interoperation part 502, an application interoperation part 500, and a data meaning interoperation part 504.

The protocol interoperation part 502 provides interoperability between different messages at an application level and provides a protocol translation function and a data format translation function. The protocol translation provides mutual translation between a local protocol and a standardized meta protocol, and the data format translation function provides mutual translation between a local message format and a standardized meta message format.

The application interoperation part 500 provides interoperability between different peer services, and provides various discovery mechanism translations, mutual information collection translation between different peer services, mutual controlling/monitoring translation between peer services, mutual event registration/removal processing translation between different peer services, and mutual event transmission processing translation between different peer services.

The discovery mechanism translation provides a function of allowing different services to perceive a plug-in/out of a virtual device through interoperability between different local device discovery mechanisms, and the mutual information collection translation provides a function of collecting different local device information through interoperability between different local device collection mechanisms.

The mutual control/monitoring translation provides a function of controlling and monitoring different local devices through interoperability between different device control/monitoring mechanisms, and the mutual event registration/removal processing translation provides a function of registering and removing events of different local devices through interoperability between different device event registration/removal mechanisms. The mutual event transmission processing translation provides a function of transmitting events of different local devices through interoperability between different device event creation mechanisms.

The data meaning interoperation part 504 represents interoperability for the meanings of information of different local devices, and allows the semantics of different devices to be shared by the devices through translation to a standardized meta profile by a property mapper, a function mapper, an action mapper, and an event mapper.

Figure 6:
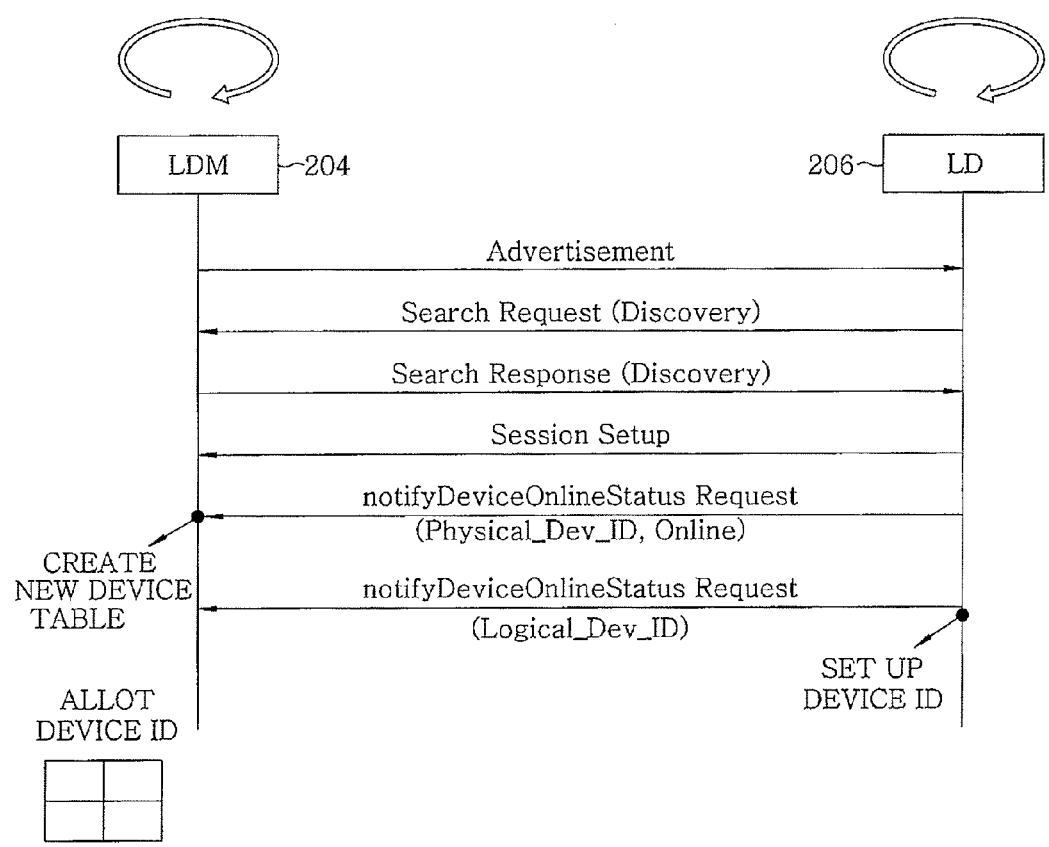
FIG. 6 is a flowchart illustrating a local device auto-configuring operation between a local device manager (LDM) and a local device (LD) in accordance with an embodiment of the present invention.
Figure 7:
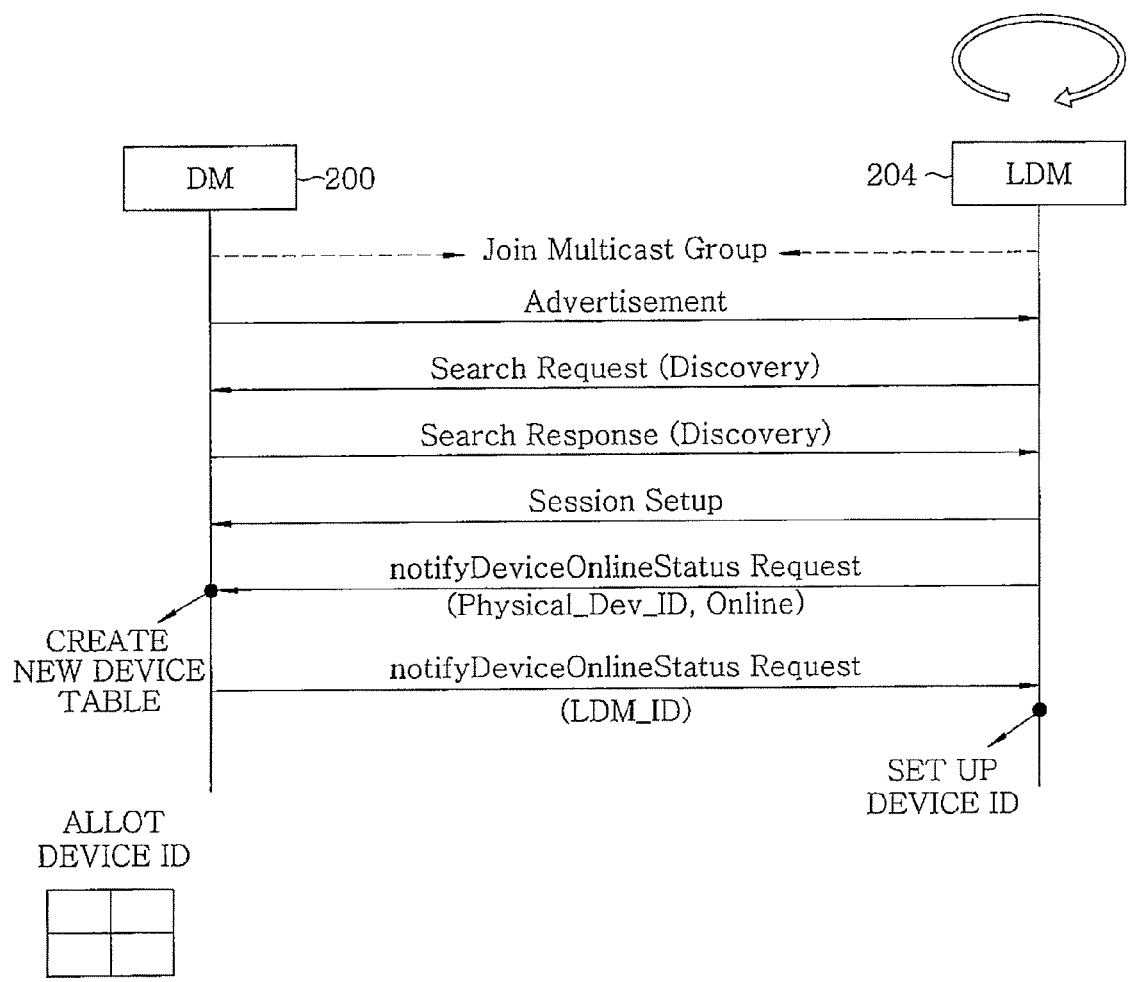
FIG. 7 is a flowchart illustrating a local device auto-configuring operation between a device manager (DM) and an LDM in accordance with an embodiment of the present invention.

FIGS. 6 and 7 illustrate operation control flows in which different local devices in a ship are automatically and dynamically configured through LD, LDM, and DM middleware components in accordance with an embodiment of the invention.

Referring to FIG. 6, when a new LD 206 is to be connected to a ship device management structure network including the DM 200 and the LDM 204, it receives an advertisement message from the LDM 204 and then transmits a search request message.

Then, the LDM 204 transmits a search response message as a response to the search request message, and the LD 206 discovers an address of the LDM 204 and sets up a session for network connection to the LDM 204 to be connected to the network. Accordingly, the LDM 204 creates a table for the newly connected LD 206 and allots the LD 206 with an ID to register the LD 206.

Referring to FIG. 7, when the new LDM 204 is to be connected to the ship device management structure network including the DM 200 and the LDM 204, it receives an advertisement message from the DM 200 and then transmits a search request message.

Then, the DM 200 transmits a search response message as a response to the search request message, and the LDM 204 discovers an address of the DM 200 and sets up a session for connection to the DM 200 to be connected to the network. Accordingly, the DM 200 creates a table for the newly connected LDM 204 and allots the LDM 204 with an ID to register the LDM 204.

Figure 8:
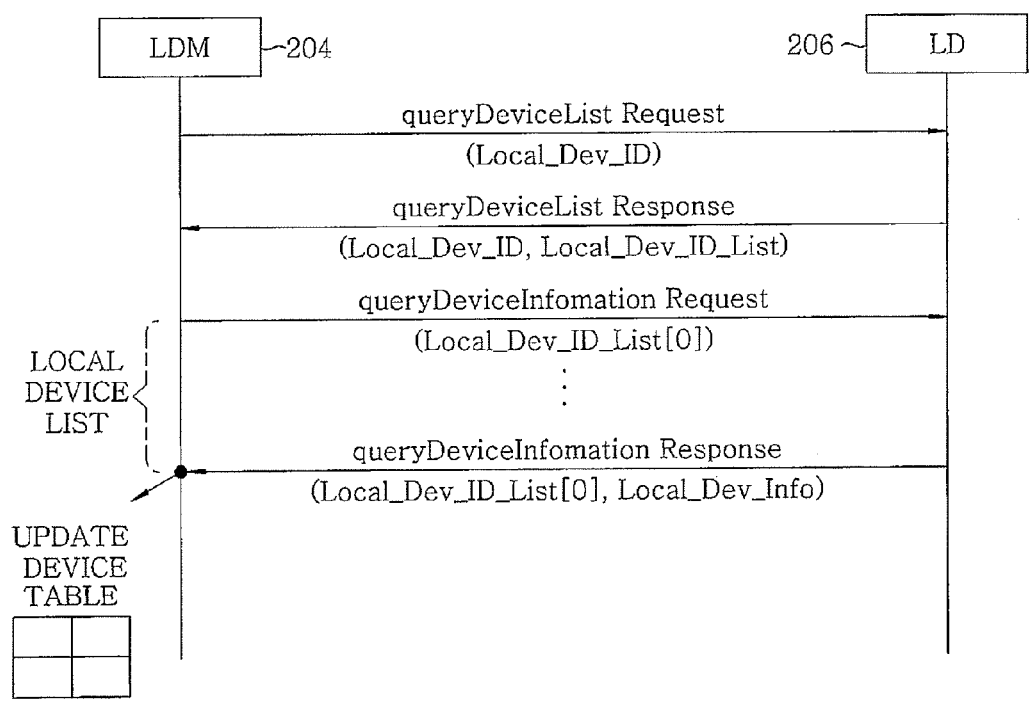
FIG. 8 is a flowchart illustrating an operation of collecting LD information in accordance with an embodiment of the present invention.

FIG. 8 illustrates an operation control flow for collecting information of a newly connected LD in accordance with an embodiment of the invention.

Referring to FIG. 8, the LDM 204 transmits a queryDeviceList request message to obtain all lists of the newly connected LD 206, and the LD 206 transmits the lists of local devices to the LDM 204 through the queryDeviceList response message.

Then, the LDM 204 transmits a queryDeviceInformation request message to collect information for each device managed by the LD 206.

Thereafter, the LD 206 transmits information regarding the device managed by the LD 206 to the LDM 204 through the queryDeviceInformation response message, and the LDM 204 that has received the queryDeviceInformation response message updates corresponding information in a device database.

Figure 9:
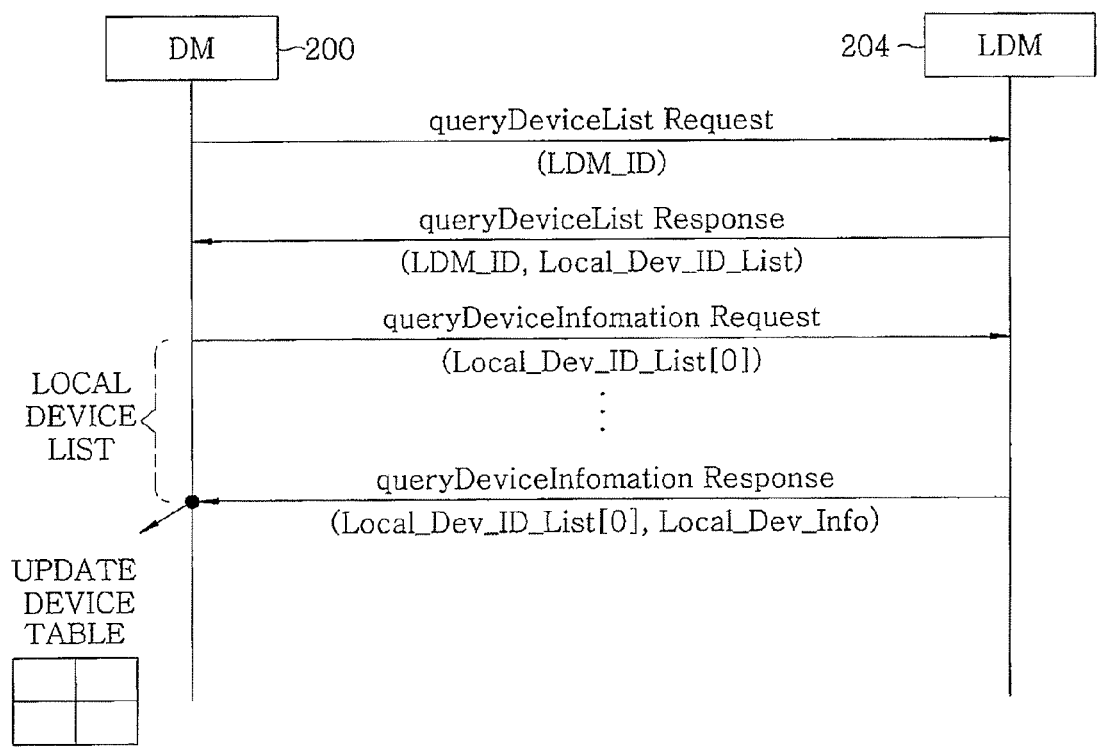
FIG. 9 is a flowchart illustrating an operation of collecting LDM information in accordance with an embodiment of the present invention.

FIG. 9 illustrates an operation control flow in which the DM 200 collects information of a local device managed by the LDM 204 according to the embodiment of the invention.

Referring to FIG. 9, the DM 200 transmits a queryDeviceList request message to obtain all device lists managed by the LDM 204, and the LDM 204 transmits local device lists to the DM 200 through a queryDeviceList response message.

Then, the DM 200 transmits a queryDeviceInformation request message to collect information regarding a local device managed by the LDM 204, and the LDM 204 transmits information regarding the corresponding local device through a queryDeviceInformation response message. Thereafter, the DM 200 updates a database regarding the local device.

Figure 10:
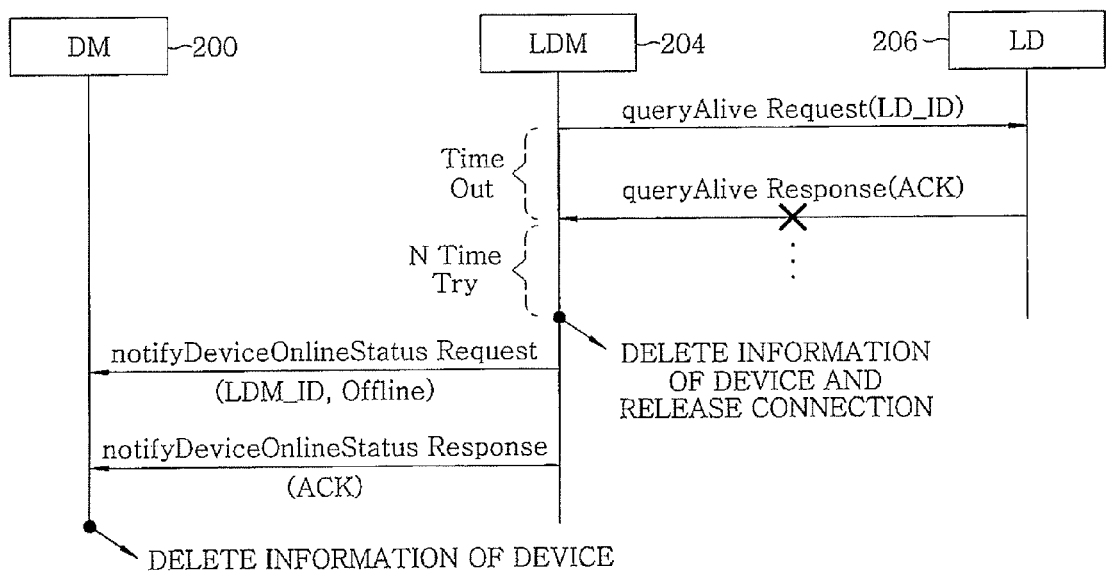
FIG. 10 is a flowchart illustrating an operation of releasing connection of the LD in accordance with an embodiment of the present invention.

FIG. 10 illustrates an operation control flow for releasing connection of the LD in accordance with an embodiment of the invention.

Referring to FIG. 10, the LDM 204 periodically transmits a queryAlive request message as a heartbeat message to check whether the LD 206 registered in the LDM 204 itself is alive. Then, when there is no response message for a specific period of time, the LDM 204 determines that the connection to the LD 206 is released and informs the DM 200 that the connection to the LD 206 is released after deleting information regarding the LD 206 from the database.

Accordingly, the DM 200 perceives that the connection to the specific LD 206 is released through a message query/response regarding the device state with the LDM 204, and then deletes information regarding the LD 206 from the database.

Figure 11:
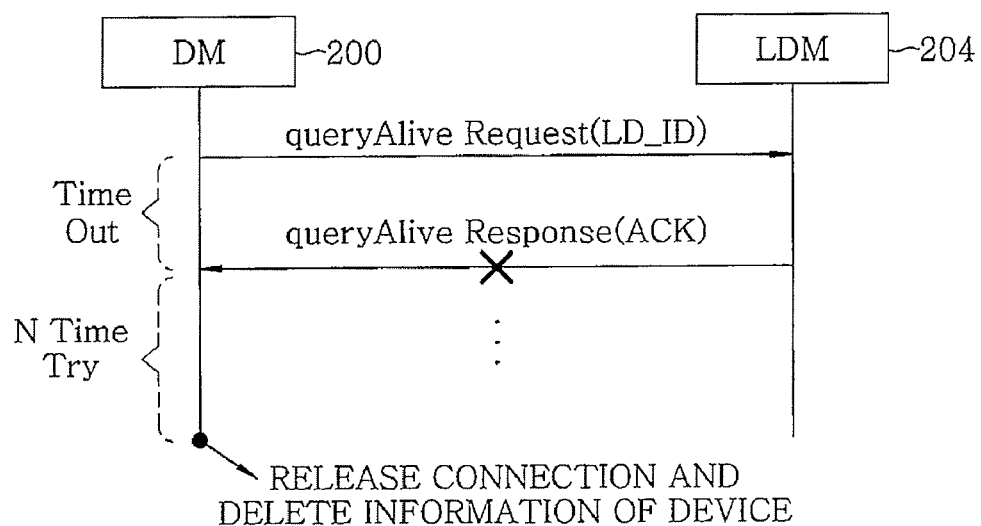
FIG. 11 is a flowchart illustrating an operation of releasing connection of the LDM in accordance with an embodiment of the present invention.

FIG. 11 illustrates an operation control flow for releasing connection to the LDM in accordance with an embodiment of the invention.

Referring to FIG. 11, the DM 200 periodically transmits a queryAlive message as a heartbeat message to check whether the LDM 204 is alive. Then, when there is no response message for a specific period of time, the DM determines that connection to the LDM 204 is released and informs a maintenance service center (MSC) and a remote server (RMS) located at a remote place connected through a wired/wireless communication network of information regarding the LD whose connection is released after deleting information regarding all LDs managed by the LDM 204 from the database.

Figure 12:
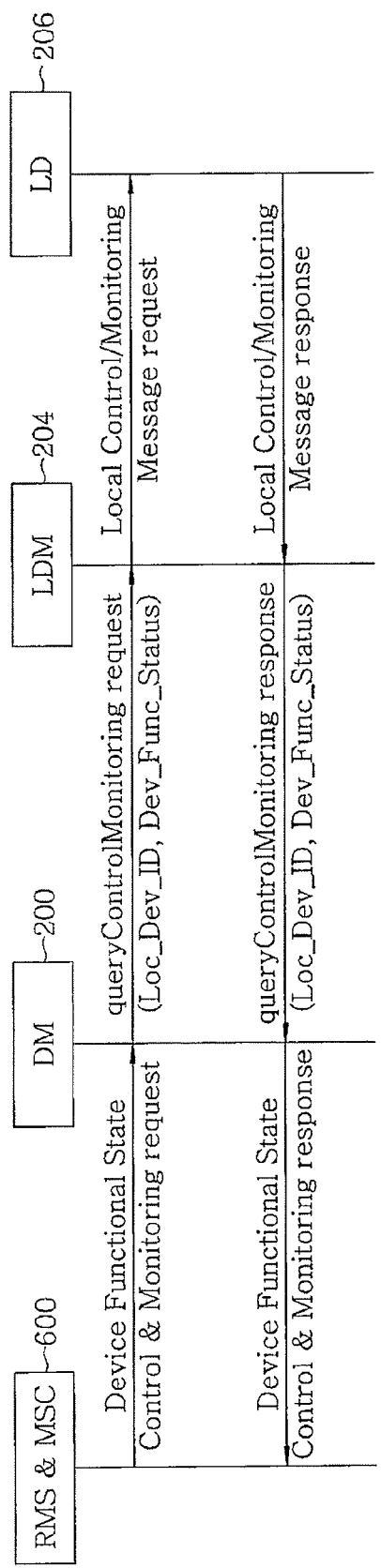
FIG. 12 is a flowchart illustrating an operation of monitoring or controlling the LD in accordance with an embodiment of the present invention.

FIG. 12 is an operation control flow in which the RMS and MSC 600 performs a monitoring and controlling operation of the LD 206 in the ship device management structure network structure in accordance with an embodiment of the invention.

Referring to FIG. 12, the RMS and MSC 600 connected to the DM 200 through a wired/wireless communication network and located at a remote place transmits a queryControlMonitoring request message to the DM 200 to check the function state of the specific LD 206 in the ship.

Then, the DM 200 that has received the queryControlMonitoring request message transmits the request message to the LDM 204, and then, the LDM 204 that has received the queryControlMonitoring request message translates a standardized meta protocol message into a local message of a local protocol through the IWF 202 and transmits the translated local message to the LD 206.

Accordingly, after the LD 206 that has received the queryControlMonitoring request message from the LDM 204 performs a corresponding functional operation, it transmits a response message of the controlling/monitoring result to the LDM 204 and then the LDM 204 transmits to the DM 200 the response message of the controlling/monitoring result transmitted from the LD 206. Then, the DM 200 transmits to the RMS and MSC 600 a response message of the controlling/monitoring result transmitted from the LD 206 and reports the controlling/monitoring result.

Figure 13:
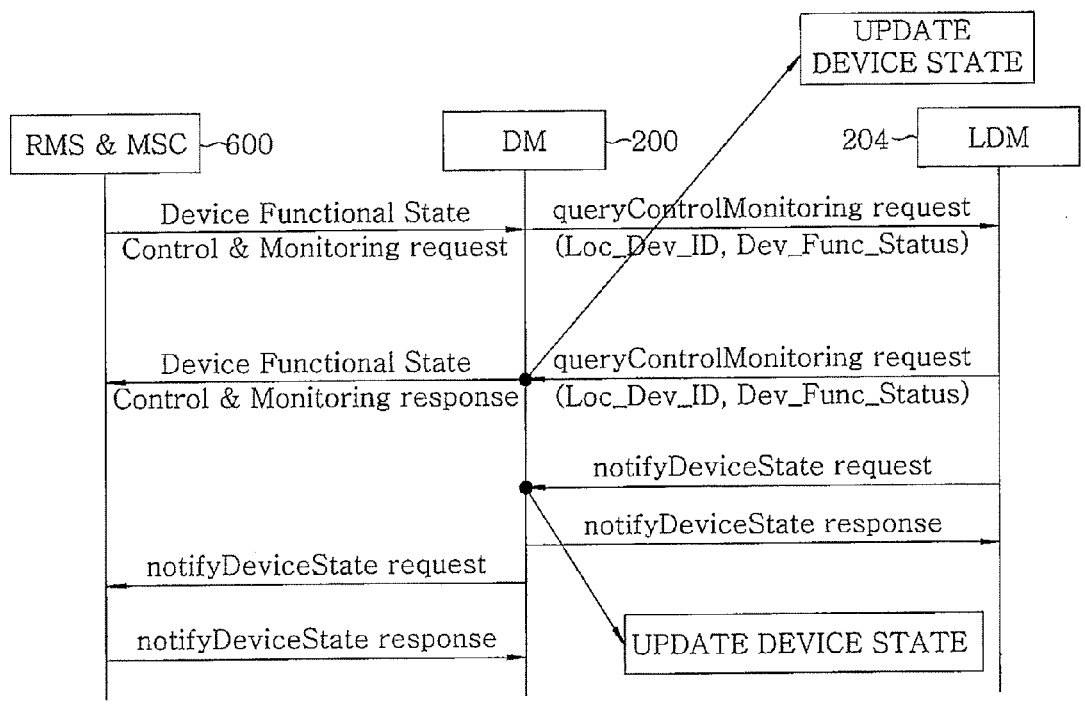
FIG. 13 is a flowchart illustrating an operation of managing the state of the LD in accordance with an embodiment of the present invention.

FIG. 13 illustrates an operation control flow in which the RMS and MSC manages the state of the LD in the ship device management structure network structure.

The DM 200 continuously maintains and manages recent state information regarding the LD 206 to provide information regarding a lifecycle (INIT, ACTIVE, INACTIVE, and BLOCKED), a functional state (for example, Lamp ON/OFF), and a performance state (for example, CPU occupancy, usage of a memory and HDD, usage of a network) of the LD 206 to the RMS and MSC 600.

Hereinafter, an operation of managing a state of an LD will be described. First, when there is a control instruction regarding the LD 206 registered in the ship device management structure network from the RMS and MSC 600, the DM 200 updates a recent state of the LD 206 in a database through transmission/reception of a query/response message to and from the LDM 204 managing the LD 206. Further, when a device event occurs in the LD 206, the DM 200 updates in a database recent state information of the device to maintain the recent state information.

Figure 14:
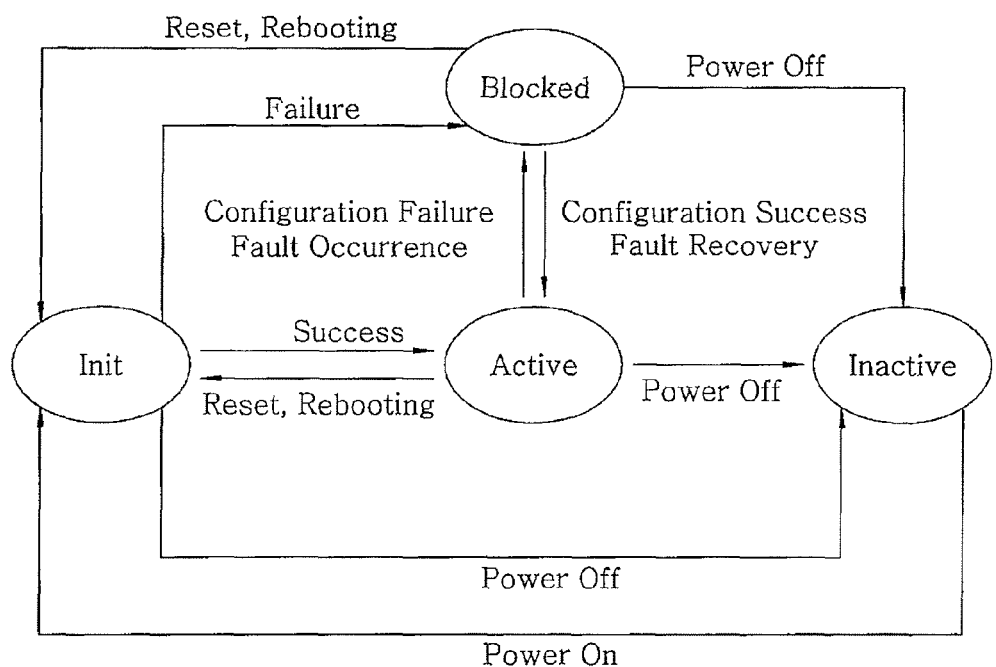
FIG. 14 is a concept view illustrating the life cycle of the LD in accordance with an embodiment of the present invention.

FIG. 14 illustrates the concept of a lifecycle of the LD in accordance with an embodiment of the invention.

Referring to FIG. 14, the INIT state of the LD 206 represents a state of initializing and invocating a necessary resource according to the device initializing policy. The ACTIVE state represents a state of performing a device function after normally finishing the device initializing process. The INACTIVE state represents a state in which the device is powered off. The BLOCKED state represents a state of not performing the function of the device normally due to an occurrence of fault.

Figure 15:
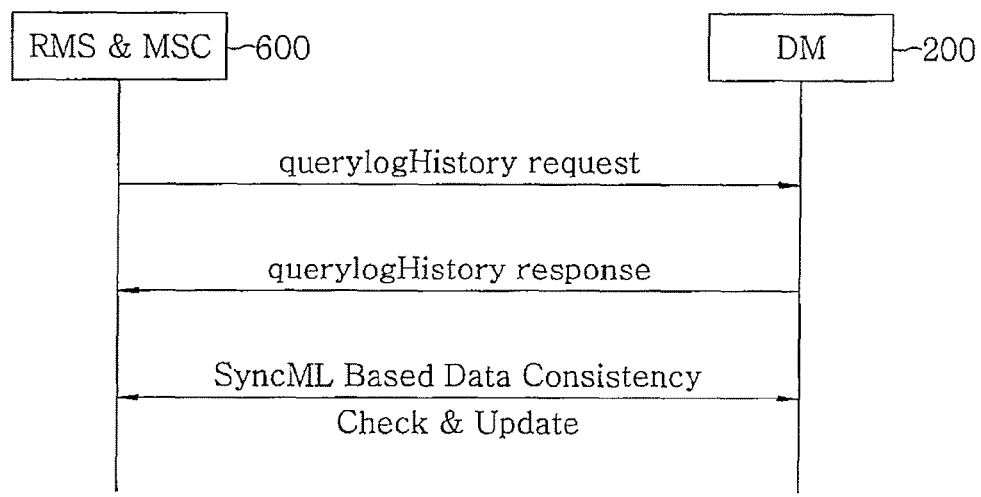
FIG. 15 is a flowchart illustrating an operation of managing the log history of the LD in accordance with an embodiment of the present invention.

FIG. 15 illustrates log history management of the LD in a ship device management structure in affordance with an embodiment of the invention.

Referring to FIG. 15, the DM 200 performs the following operation to provide an operation history of all devices operated in a ship to the RMS and MSC 600.

First, the RMS and MSC 600 transmits a queryLogHistory request message to receive all log information of a specific LD 206. Then, the DM 200 sends all log information of the LD 206 through the queryLogHistory response message.

Then, if connection between the RMS and MSC 600 and the DM 200 is set, changed items are checked through an inspection of a device and event table regarding SyncML based devices. When the table is changed, the information is updated to synchronize the table information between the DM 200 and the RMS and MSC 600.

Figure 16:
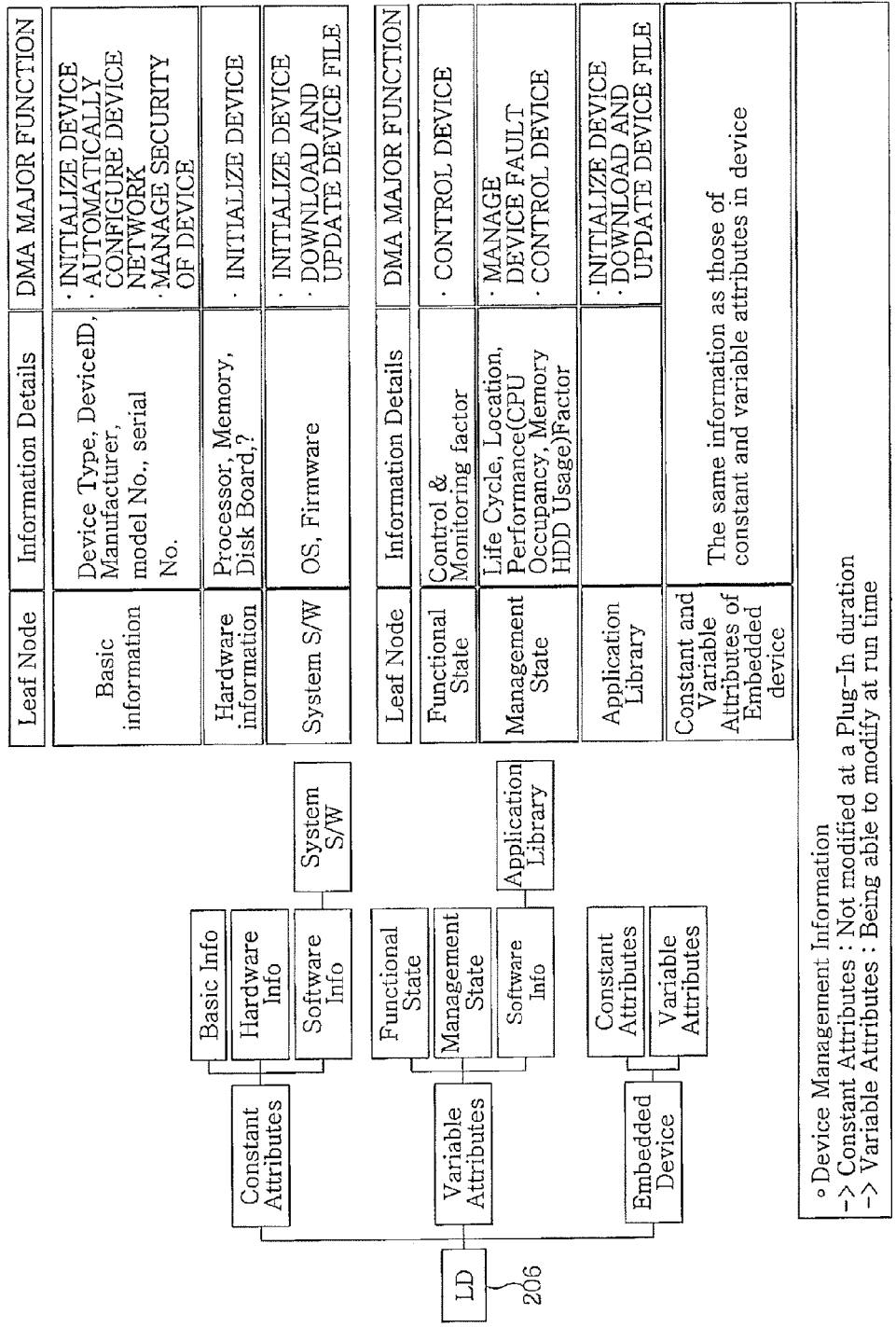
FIG. 16 is an exemplary view illustrating LD management information in accordance with an embodiment of the present invention.

FIG. 16 illustrates local device management information collected through the ship device management architecture in accordance with an embodiment of the present invention. The DM 200 hierarchically manages information regarding all LDs 206 on the ship network as illustrated in FIG. 16, and maintains and repairs all local devices in the ship even at a remote place by providing the information to the RMS and MSC 600 connected though a wired/wireless communication network.

While the invention has been shown and described with respect to the embodiment, it will be understood by those skilled in the art that various changes and modifications may be made without departing from the scope of the invention as defined in the following claims.

What is claimed is:

1. An apparatus for integrally managing a ship, comprising:
   a device manager for integrally managing different types of local ship devices in the ship by using a standardized protocol message;
   a local device manager for managing local ship devices in a legacy environment on the basis of an independent local protocol; and
   an inter-working framework (IWF) for performing translation of a protocol for compatibility between the standardized protocol and the independent local protocol to manage the different types of local ship devices between the device manager and the local device manager.

2. The apparatus of claim 1, wherein the IWF includes:
   an application interoperating part for providing interoperability between peer services of the different types of local ship devices;
   a protocol interoperating part for providing interoperability between messages of the different types of local ship devices at an application level; and
   a data meaning interoperating part for providing interoperability between meanings of messages of the different types of local ship devices.

3. The apparatus of claim 2, wherein the application interoperating part includes:
   a mechanism translator for providing interoperability between discovering mechanisms of the different types of local ship devices;
   a mutual information collector for collecting device information through interoperability between collecting mechanisms of the different types of local ship devices;
   a mutual controller/monitor for controlling or monitoring devices through interoperability between controlling/monitoring mechanisms of the different types of local ship devices; and
   a mutual event processor for registering or removing events of the local ship devices through interoperability between event registering/removing mechanisms of the different types of local ship devices.

4. The apparatus of claim 2, wherein the protocol interoperating part includes:
   a protocol translator for performing mutual translation between the local protocol and a standardized meta protocol; and
   a data format translator for performing mutual translation between a message format of the local protocol and a message format of the standardized meta protocol.

5. The apparatus of claim 1, wherein the device manager receives a remote control instruction for remotely maintaining and repairing the local ship device from a remote server connected through a wired/wireless communication network.

\* \* \* \* \*